3,139,657
CURING EPOXIDE RESIN COMPOSITIONS
George P. Maly, Fullerton, Calif., assignor to Union Oil Company of California, Los Angeles, Calif., a corporation of California
No Drawing. Filed Jan. 11, 1960, Ser. No. 1,437
16 Claims. (Cl. 22—193)

This invention relates to curing epoxide resins, and in particular concerns an improved method wherein an epoxide resin composition is cured or is hardened with the aid of a gaseous curing agent.

Within recent years, the so-called "epoxide" resins have attained a prominent place in various arts. For the most part these resins are epoxy ether condensation polymers having the general formula:

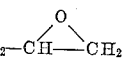

wherein $n$ represents a number (0, 1, 2, 3, etc.) and R represents the divalent radical of a polyhydroxy compound, such as glycerine, propylene glycol, hydroxyphenol, dihydroxybenzophenone, bis-(4-hydroxyphenyl)-2,2-propane ("Bis-phenol-A"), bis-(4-hydroxyphenyl)2,2 butane, bis-(4-hydroxyphenyl)-4,4 pentanoic acid ("diphenolic acid"), tetrachlorobisphenol-A, etc. These products are obtained commercially by condensing epichlorohydrin with one of the aforesaid polyhydroxy compounds, usually bis-phenol-A. The value of $n$ is determined by the relative concentration of epichlorohydrin reactant to the polyhydroxy compound; the greater the concentration of epichlorohydrin, the lower the value of $n$. The value of $n$ determines many of the characteristics of the ether polymer which is liquid at room temperatures for values of $n$ between 0 and about 3 and solid for values of $n$ greater than about 3. The physical properties of the final hardened resin are also determined by the value of $n$, for the greater the value of $n$, the greater the cross-linking in the resin and hence the greater the strength and durability of the hardened resin.

Other epoxides, also suitable for use in this invention, either alone or in combination with the aforementioned ether condensation polymers, are styrene oxide, butadiene dioxide, the monoxide and dioxide of vinyl cyclohexane, 4-epoxy-6-methylcyclohexane-carboxylate, and other epoxides obtained by the action of peracetic acid and the like on such unsaturates as soybean oil, butyl oleate, etc.

The condensation reaction whereby the epoxide resin is formed does not occur spontaneously, i.e., it requires initiation and/or promotion by means of heat and/or a condensation catalyst or curing agent. Conventionally, the resins are marketed in the form of liquid compositions comprising the partially condensed resin and a curing agent, with the final cure to solid resin form being effected at the time of use by heating the composition to a moderately elevated temperature. However, the curing agents which are so employed have a certain degree of activity at ambient temperatures, and consequently such compositions slowly harden during storage, i.e., they have a finite shelf life. Also, in certain applications it is inconvenient to heat the composition at the time of use.

The present invention is directed to a method whereby epoxide resin compositions can be cured or hardened at ambient temperatures and without requiring the incorporation of a curing agent in the composition itself. This is accomplished through the use of certain curing agents which are sufficiently active so as to effect the desired cure at ambient temperatures. Said agents are normally gaseous (i.e., they boil below about 10° F. at atmospheric pressure) and are so active that they can be used only in conjunction with means for absorbing the high exothermic heat of the curing reaction. In accordance with the invention, said means takes the form of an inert solid whose mass is relatively large with respect to the mass of the resin to be cured.

In carrying out the process of the invention it is preferred to employ liquid epoxide compositions for ease of dispersion of the same over the surface of the solid heat absorbent; however, the use of solid epoxide compositions is not beyond the scope of the invention. When the liquid epoxide has a low viscosity and tends to drain from the heat absorbent before it can be hardened, it is within the scope of the invention to add thickening agents, such as powdered silica, clay or mica, or short fibers of glass or asbestos to the liquid to impart thixotropicity and avoid drainage. Alternatively, when the epoxide is very viscous, as are the phenolic type ether condensation polymers having high $n$ values, any of the known viscosity-lowering agents, e.g., styrene oxide, vinyl cyclohexane dioxide, allyl glycidyl ether, phenyl glycidyl ether, or butyl glycidyl ether, can be added to the epoxide to reduce its viscosity. Solid epoxide compositions can be employed by powdering the solid resin and then dry-mixing it with the heat absorbent. If desired, a solid epoxide can be dispersed in the aforementioned low viscosity liquid epoxides and the resultant viscous liquid can then be applied to the surface of the heat absorbent either as such or dispersed in a volatile solvent which is evaporated before bringing the mass into contact with the curing agent. The heat adsorbent mass can be an article to be coated with an epoxy, e.g., an appliance, or can be an aggregate mass of particulate solids to be bonded by an epoxy, e.g., packed sand. These embodiments are described in greater detail in subsequent paragraphs.

While one of the advantageous features of the present process lies in the fact the resin compositions to which it is applied need not comprise a curing agent, it is nonetheless operative with respect to the curing of conventional epoxide compositions comprising conventional curing agents, e.g., phthalic anhydride, etc.; in such case the combined curing agent supplements the action of the gaseous curing agent.

The gaseous curing agents which are employed in accordance with this invention are certain inorganic nitrogen and halogen compounds. Among these compounds are the following: halogen gases such as fluorine, chlorine, and bromine; hydrogen halides such as hydrogen fluoride, hydrogen chloride, hydrogen bromide, and hydrogen iodide; gaseous boron-halogen compounds such as boron trichloride, boron trifluoride, boron monochloride pentahydride, and boron monobromide pentahydride; gaseous silica-halogen compounds such as silicon fluoride, trifluorosilicane, and chlorosilicane; gaseous dual halogen compounds such as bromine chloride, and chlorine mono- and tri-fluorides; gaseous nitrogen-halogen compounds such as chloroazide, nitrosyl chloride, nitrosyl fluoride, nitrosyl bromide, nitryl chloride and nitryl fluoride; nitrogen dioxide; and nitrogen tetraoxide. These materials are highly active as curing agents at ambient temperatures. If desired their activity can be moderated by admixing them with an inert diluent such as nitrogen, carbon dioxide, etc. The use of an inert diluent is preferred with the extremely active curing agents, e.g., the dual halogen compounds, to avoid overheating and damage to the resin.

Usually, but not necessarily, the present curing agents are employed at ambient temperatures, and if desired the temperature of the mass during curing can be controlled by controlling the temperature of the curing agent. Thus, when extremely active curing agents are employed they can suitably be cooled below ambient temperature to avoid overheating of the resin by the exothermic heat release of curing. When the less active gaseous curing agents are employed, they can be suitably heated slightly above ambient temperature to initiate the reaction. In addition to eliminating the need to mix the hardening agent with the epoxide resin prior to use of application of the same, use of the present agents eliminates the necessity for careful proportioning of the curing agent and the resin so as to achieve complete hardening of the resin without excessive dilution by the hardening agent.

It is essential that the epoxide composition be in contact with a solid heat absorbent during its treatment with the gaseous curing agent. It is also essential that the epoxide composition be in the form of a thin film with its surface area exposed for contact with the gaseous agent. Films greater than about 0.01 inch thickness cannot be completely cured by the gaseous agent because the cure is so rapid that an impermeable layer of resin is formed at the exposed surface and further penetration of the gas to the uncured resin beneath this film is impossible.

As previously mentioned, the process of the invention is applicable to provide an attractive and durable protective coating for various materials, as for example in the painting of automobile bodies or appliances. When thus used for coating, the epoxide resin is suitably one which has been esterified with fatty or rosin acids in the known manner. The epoxide, either esterified or unesterified, is suitably combined with pigments and a pigment vehicle, varnishes, anti-skinning agents and/or drying oils to produce a final coating composition which is applied to the article in the form of a thin film or coat by spraying, rolling, dipping or brushing. For spray coating, the average film thickness is about 0.5 to 2.5 mils. Regardless of the method of application, the film thickness is never greater than about 0.01 inch to insure complete hardening of the resin when contacted with gaseous curing agent. After the film has been applied to the article, the latter is placed in a curing zone which may suitably take the form of a closed chamber or even a tent-like structure comprising a plastic sheet, such as polyethylene, supported over the article. In either event, the gaseous curing agent, with or without a diluent gas, is passed into contact with the coated article. The hardening of the resin is almost instantaneous, with 80 percent of the resin strength being achieved in about two seconds, at which time the article is removed from the curing zone. Complete or 100 percent strength of the resin is reached about 24 hours after the resin has been contacted. It is apparent that this method greatly reduces the time normally employed for conventional baked or air-dried finishes, as well as eliminating the heating lamps or drying ovens commonly employed.

The invention is also applicable to cement or bond an aggregate mass which can comprise various particulate matter, e.g., naturally-occurring materials such as sand, gravel, crushed rock, clay, limestone, marble, quartz; various powdered metals or metal oxides such as iron oxide, alumina, copper, steel; plastic or glass foams, fibers or spheres; and miscellaneous materials, such as asbestos or graphite. The choice of any particular material is governed largely by the ultimate use of the cemented mass; sand with an American Foundryman's Society (AFS) fineness number between about 20 to 200 being preferred for molding compositions, coarser gravel being preferred for highway and airport construction, plastic foam being preferred for filling material in the construction industry, and glass spheres being preferred for the manufacture of honeycomb insulating structures. Although a wide variety of materials can be employed, it is preferred that the material chosen be relatively dry, for I have discovered that use of relatively dry material permits achievement of maximum resin strength. Regardless of the material employed and the use to which it is adapted, the cemented aggregate mass is both porous and permeable, i.e., it contains voids or unfilled interstices between the individual particles, and permits the passage of fluids therethrough.

The formation of porous permeable masses as described above is particularly well adapted to use in shell molding. The cope and drag pattern are prepared in the usual manner and can be either cameo or intaglio, depending on the shape of the desired casting, and can comprise any suitable material, such as clay, wood, metal, plaster or plastic. To the pattern is applied a parting agent which can be wax, polyvinyl alcohol, methyl cellulose, or a silicone grease. When the pattern is made of polyethylene, no parting agent is necessary since the epoxide resins do not adhere to this plastic. The pattern is then placed in a suitable mold flask, and a suitable mixture of molding sand and epoxide resin is spread over the pattern. Suitably, sand with an AFS fineness between about 20 and 200, preferably between about 50 and 125, is employed in admixture with about 1 to 15 weight percent of the epoxide resin composition. The actual concentration of epoxide will depend on the fineness of sand; coarser sand requiring a lower concentration than the finer sand. It is important, however, that the resin content of the mixture be sufficiently low so that the cured mold is permeable to the flow of fluids to permit diffusion of gases formed during casting. It has been found that if the resin exceeds about 20 weight percent for a 100 mesh sand, permeability to fluids will be lost although the cured aggregate will still be porous. In addition to causing impermeability, resin concentrations in excess of that required to impart sufficient strength to the mold are not desired because excessive fire and smoke is formed by combustion of the resin when the molten metal is poured into the mold. In general, a very satisfactory concentration for sand molding is between about 66 and 1000 parts of sand per part of resin, preferably between about 85 and 98 parts of sand per part of resin. In an alternative method of molding, the pattern is first covered with a thin sand layer which is then sprayed with the epoxide resin. This procedure is repeated two or three times until a sufficient thickness of sand and resin is built up to provide adequate strength to the mold. After the pattern has been covered with a layer of sand and resin, the layer is then cured by contacting with the gaseous curing agent. When the mold is sufficiently small, it is placed within a separate chamber to which the gaseous curing agent is admitted. When very large molds are made and the use of a separate chamber is impractical, the mold is covered with a plastic sheet, e.g., polyethylene, and the gas is passed under the sheet. An exhaust blower is provided beneath the pattern-shell or at the end opposite the gas entrance to remove excess curing agent. The pattern-shell mold is removed within a few minutes after contacting with the gas, and the pattern is stripped from the hardened shell mold. When the pattern is flexible, i.e., when made from rubber or plastic, it is readily removed without need to fabricate special releasing or ejector means in the pattern as is the practice with rigid patterns. The mold halves are then assembled and employed in the conventional manner in the remainder of the casting process.

It is apparent that this method greatly reduces the number of steps normally employed in the shell molding process. No extraneous heat is supplied to the mass of sand and resin during the curing step and since the loss of heat from the mass (the temperature of which rises due to the exothermic heat release) to the surrounding atmosphere is slight, the curing is conducted under substantially adiabatic conditions. This eliminates the need for over-curing of the shell mold and thereby enables the casting of extremely large articles not before possible when the entire mold had to be heated in an oven. Because the curing is initiated at ambient or room temperatures, the step of preheating the cope and drag section and of oven-curing the pattern-shell mold are also eliminated. Because the pattern is not subjected to high temperatures, a wide variety of materials may be employed for the pattern not heretofore possible, such as plastic, wood, rubber, or other readily ignitable substances which are easier and less costly to fabricate than are metal patterns. The use of a flexible material, such as an elastomer, i.e., those natural and synthetic substances having the properties of natural, reclaimed, vulcanized or synthetic rubber, e.g., natural rubber, polybutadiene, polyisobutylene, etc., or other flexible plastics such as polyethylene, polyvinyl chloride, polymethyl-methacrylate, etc., which can be peeled from the mold eliminates the need for ejecting and releasing means in the pattern, thereby simplifying its construction.

Other uses of porous and permeable aggregate masses bonded with an epoxide resin in accordance with the present process are found in airport runway construction and in road surfacing where the permeability of the material permits drainage of surface waters, and the epoxide coating advantageously provides skid-proof properties even when wet. The bonded aggregates can also be suitably employed as a filter medium, because they exhibit no preference in wettability to polar and non-polar fluids and are useful where an inert filter medium is desired, e.g., in the removal of solids from a mixed water and oil system. Another suitable application of epoxide bonded aggregate masses is for use as a tobacco smoke filter. Because the epoxide coating is of neutral wettability, it permits use of various aggregates which have many desirable characteristics for smoke filtration, but which have not been widely employed because of their desiccant properties. Thus, for example, silica gel, alumina, or clay have not been employed as cigarette filters because they tend to dry the cigarette tobacco before use and give a harsh smoke. By coating and bonding these materials with an epoxide resin, however, it is possible to obtain a cigarette filter which has a high heat capacity to cool and condense the tars and nicotine in the smoke and which does not dry the tobacco before smoking.

The following will illustrate the use of various gaseous curing agents according to the invention. Proportions in the following examples are in parts by weight.

Example I

In this and succeeding examples, an epoxide prepolymer resin was mixed with 135 AFS sand in a ratio of 1:100 parts. Two epoxide prepolymers were tested in each of these examples; (1) the dioxide of vinylcyclohexane, and (2) the reaction product of "bisphenol-A" and epichlorohydrin. Short sections of glass tubing were packed with each of the epoxide coated sands and at room temperature, and one to two pore volumes of the gaseous curing agent—boron trifluoride in this example—were passed through the packed tubes. The sand masses instantaneously became very hot when contacted with the boron trifluoride vapors, and the epoxide coatings were completely hardened within a few seconds thereafter. After contacting, the consolidated sands were inspected and found to be of strengths equal to that of a similar sand mass consolidated with twice the amount of epoxide resin but hardened at elevated temperatures with a conventional hardener, diethylene triamine.

When boron trifluoride gas is discharged into a homogeneous mass of epoxide prepolymer resin, e.g., into a beaker filled with a liquid epoxy, bubbles of boron trifluoride vapor are trapped inside the liquid within envelopes formed by a thin impermeable film of hardened resin which prevents dispersion of the vapor through the liquid epoxide mass.

Example II

The test procedure of Example I was repeated, employing between one and two pore volumes of boron pentafluoride as the gaseous curing agent. The cure hardening was extremely rapid and indicated the desirability of employing a diluent in combination with this particular curing agent.

Example III

The test was repeated, employing between one and two pore volumes of boron trichloride as the gaseous curing agent. The reaction was not as rapid as observed in Examples I and II, with a lesser heat release, and the consolidated sand masses were not as rigid as obtained with either boron tri- or pentafluoride.

Example IV

The test procedure was repeated, employing between one and two pore volumes of silicon fluoride as the gaseous curing agent. A rapid reaction with a high heat release was achieved to produce a consolidated sand mass having excellent strength within a few seconds after contacting the epoxy coated sand with the gas.

Example V

The test procedure was repeated employing between one and two pore volumes each of bromine trifluoride and bromine pentafluoride. The reaction was observed to be most rapid of all the cures tested and produced extremely hard consolidated sand masses.

Example VI

The test procedure was repeated employing between one and two pore volumes of a mixture of nitrogen di- and tetra-oxide. A rapid cure hardening occurred and the consolidated sand mass attained excellent strength within a few seconds after being contacted with the gas.

The preceding examples are intended for illustration only and are not to be construed as unduly limiting the invention which comprises the cure hardening of epoxide prepolymer resins at ambient temperatures with gaseous cure hardening agents.

Having completely and clearly disclosed my invention, I therefore claim:

1. The method of cure hardening a curable epoxide resin which comprises applying said resin to the surface of a solid heat absorbent to form thereon a resin film having a thickness no greater than about 0.01 inch, and thereafter cure hardening said resin by passing a normally gaseous epoxide resin curing agent in contact with said film, exhausting excess curing agent and recovering said solid absorbent having a cure hardened epoxy resin coating.

2. The method of claim 1 wherein said contacting is initiated at ambient temperature.

3. The method of claim 1 wherein said heat absorbent comprises particulate matter, and is present in an amount corresponding to between about 1000 to 66 parts per part by weight of said curable epoxide resin.

4. The method of claim 3 wherein said heat absorbent comprises substantially moisture-free sand having an AFS fineness number between about 20 and about 200, and said sand having said film of epoxide deposited thereon is formed into a shaped article prior to said contacting with said curing agent.

5. The method of claim 1 wherein said curing agent is selected from the group consisting of gaseous halogens, halides and nitrogen oxides.

6. The method of claim 5 wherein said curing agent is a gaseous halogen.

7. The method of claim 5 wherein said curing agent is a hydrogen halide.

8. The method of claim 5 wherein said curing agent is a gaseous boron halide.

9. The method of claim 5 wherein said curing agent is a mixture of nitrogen dioxide and nitrogen tetraoxide.

10. Method for fabricating shell molds and like structures which comprises forming a porous and permeable mass about an unheated mold pattern, said mass consisting essentially of between about 85 to 98 parts sand having an AFS fineness number between about 20 and 200 and between about 2 and 15 parts of an epoxide resin as a film having a thickness no greater than about 0.01 inch on the grains of said sand, thereafter cure hardening said resin by passing a normally gaseous epoxide resin curing agent in contact wih said film, ceasing said contact, exhausting said gaseous agent from said mass and removing said pattern from the resultant consolidated shell.

11. The method of claim 10 wherein said contact with said agent is under substantially adiabatic conditions.

12. The method of claim 10 wherein said mold pattern is composed of a flexible material and is stripped from said consolidated shell.

13. The method of claim 12 wherein said flexible material is polyethylene.

14. The method of claim 12 wherein said flexible material is an elastomer and is coated with a parting agent.

15. The method of claim 10 wherein said normally gaseous curing agent is a boron halide.

16. The method of claim 1 wherein said heat absorbent comprises an object to be coated with a cured epoxide resin.

References Cited in the file of this patent

UNITED STATES PATENTS

| | | |
|---|---|---|
| 2,476,726 | Haas | July 19, 1949 |
| 2,735,829 | Wiles et al. | Feb. 21, 1956 |
| 2,846,742 | Wagner | Aug. 12, 1958 |
| 2,895,838 | Ilenda | July 21, 1959 |
| 3,008,205 | Blaies | Nov. 14, 1961 |

FOREIGN PATENTS

| | | |
|---|---|---|
| 531,968 | Canada | Oct. 16, 1956 |
| 542,111 | Canada | June 11, 1957 |